United States Patent Office 3,277,127
Patented Oct. 4, 1966

3,277,127
PROCESS FOR THE PREPARATION OF 11-DESOXY-
5α,9β,10α-STEROIDS
John Edwards and Alexander D. Cross, Mexico City, Mexico, assignors to Syntex Corporation, Panama, Panama, a corporation of Panama
No Drawing. Filed July 13, 1964, Ser. No. 382,374
10 Claims. (Cl. 260—397.5)

The present invention relates to a novel process for the production of cyclopentanophenanthrene derivatives.

More particularly, the present invention relates to a novel process for the conversion of 11-keto-5α,9β,10α-steroids into the corresponding 11-desoxy compounds, especially those belonging to the estrane(19-nor-androstane) and 19-nor-pregnane series.

By the process of the present invention it is possible to prepare all kinds of 11 - desoxy - 5α,9β,10α-19-nor-steroids, such as for example, 19-nor-5α,9β,10α-dihydroprogesterone, which in turn may be converted conventionally into 19-nor-9β,10α-progesterone, which has excellent anti-androgenic properties; and 19-nor-5α,9β,10α-dihydrotestosterone which may be converted by conventional dehydrogenation into 19-nor-9β,10α-testosterone which is a compound having good anabolic and androgenic properties, and the like.

The 11-keto-5α,9β,10α-steroids, which may be obtained by alkaline treatment of the corresponding 11-keto-5α,9β,10α-steroids (in accordance with A. D. Cross U.S. Patent application Serial No. 250,479, filed January 10, 1963, now U.S. Patent No. 3,224,244, granted February 8, 1966) present a serious difficult for the elimination of the keto grouping thereof without disturbing the 5α,9β,10α-configuration. For example, this cannot be done under Wolff-Kishner conditions, for there would take place a quasi-total conversion to the 5α,9α,10α-configuration. In accordance with the present invention there has been made the discovery of a process for eliminating said keto group without affecting the configuration of the steroid nucleus. Furthermore, it has been discovered that, surprisingly, when 11-keto-5α,9β,10α-steroids are brominated with approximately 1 molar equivalent of bromine in the presence of hydrogen bromide, there is introduced a bromine atom at C-12α, in contrast with the normal pattern followed by conventional bromination of other 11-keto steroids, especially of 11-keto-5α,9α,10α-19-nor-steroids, wherein the bromine atom is introduced at the 9α position.

The process object of the present invention is exemplified by the following equation:

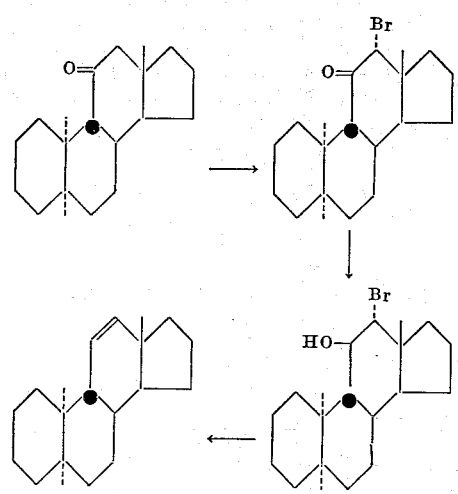

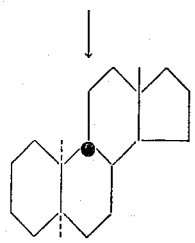

In the above formulae there are only represented the substituents which participate in the process of the present invention.

The starting compounds for the process object of this invention may be any 11-keto-5α,9β,10α-19-nor steroids, especially one of the estrane or 19-nor-pregnane series, and may have several substituents in the molecule which do not interfere with the normal course of the reactions of the present process.

For example, lower alkyl groups may be present in positions C-1, C-2, C-4, C-6, C-7, C-15, C-16 and/or C-17; hydroxyl or keto groups may be present in positions C-1, C-2, C-3, C-4, C-6, C-7, C-15, C-16 and/or C-17. There may be also present the molecule derivatives of the foregoing functional groups which are usual in steroid chemistry and are known to those skilled in the art, such as acyloxy, alkoxy, hydroxymethyl groups, and the like. Free keto groups at positions such as C-2, C-3, C-7, C-15, C-16, C-17 and/or C-20 and double bonds present, e.g., between C-1, C-2; C-3 C-4, etc., even though they undergo changes during the process, do not have any influence on its course.

The functional groups and positions indicated heretofore are only illustrative, and should not be construed as limiting.

In accordance with the above equation the starting compound (I) of the type described hereinbefore, is brominated, preferably with approximately 1 molar equivalent of bromine for each keto aldehyde function present in the starting compound, in the presence of a catalytic amount of hydrogen bromide in an organic solvent, preferably a liquid lower hydrocarbon carboxylic acid such as acetic acid or propionic acid or a chlorinated lower alkane such as methylene chloride or carbon tetrachloride, at room temperature, until total consumption of the bromine, thus affording the corresponding 12α-bromo-11-keto-5α,9β,10α-19-nor-steroid (II). The latter compound is treated with an alkali metal borohydride such as lithium or sodium borohydride, in a suitable organic solvent, such as a lower alkanol, e.g., methanol, ethanol, isopropanol, etc., or a lower hydrocarbon aliphatic or cyclic ether such as ethyl ether, propyl ether, dioxane, tetrahydrofuran etc. at a temperature preferably ranging between 0° C. and room temperature, and in particular around 10° C., for about 1 to 12 hours, preferably around 5 hours, to give the corresponding 12α-bromo-11β-hydroxy-5α,9β,10α-19-nor-steroid (III) which upon treatment with a metal having an oxidation potential around +0.75 v. such as zinc or chromium in a liquid lower hydrocarbon carboxylic acid, e.g., acetic acid or propionic acid, preferably at reflux temperature for about 1 to 10 hours, affords the corresponding $\Delta^{11}$-dehydro-5α,9β,10α-19-nor-steroid (IV). Conventional hydrogenation of the latter compound, with hydrogen in the presence of a suitable catalyst, e.g., Raney nickel, platinum, palladium on charcoal, etc. affords the corresponding 11,12-saturated 5α,9β,10α-19-nor-steroid (V).

The following compounds are suitable starting materials for the present process:
3β-methoxy - 1β - methyl - 5α,9β,10α - estrane-11,17-dione, 3β-methoxy - 19 - nor-5α,9β,10α-pregnane-11,20- dione, 3β-methoxy - 19 - nor-5α,9β,10α-pregnan-17α-ol-11,20-dione. 3β-methoxy-1β-methyl - 19 - nor-5α,9β,10α-pregnane-11,20-dione, 3β-methoxy-1α-methyl-5α,9β,10α-estrane-11,17-dione, 3β-methoxy-1α-methyl - 19 - nor-5α,9β,10α-pregnane-11,20-dione, 5α,9β,10α-estrane-3,11,17-trione, 1α-methyl - 5α,9β,10α - estrane-3,11,17-trione, 19-nor-5α,9β,10α-pregnane-3,11,20-trione, 19-nor-5α,9β,10α-pregnan-17α-ol-3,11,20-trione, 1α-methyl - 19 - nor-5α,9β,10α-pregnane-3,11,20-trione, 1β-methyl-5α,9β,10α-estrane-3,11,17-trione, 1β-methyl - 19 - nor-5α,9β,10α-pregnane-3,11,20-trione, 3β-methoxy - 1β - methyl-5α,9β,10α-estrane-17β-ol-11-one, 3β-methoxy, - 19 - nor-5α,9β,10α-pregnan-20β - ol - 11 - one, 5α,9β,10α-estrane-3β,17β-diol-11-one, 19 - nor - 5α,9β,10α-pregnane-3β,20β,diol-11-one.

The following specific examples serve to illustrate but are not intended to limit the scope of the present invention:

PREPARATION 1

A solution of 1 g. of 3β-methoxy-1β-methyl-5β,9β,10α-estrane-11,17-dione in 50 cc. of tetrahydrofuran was added over a 30 minute period to a stirred suspension of 2 g. of lithium triterbutoxy alumino-hydride in 50 cc. of anhydrous tetrahydrofuran. The mixture was refluxed for 2 hours, then cooled and treated with 100 cc. of water. The mixture was extracted with methylene chloride, the extract dried and evaporated to dryness. Crystallization of the residue from acetone-hexane yielded 3β-methoxy-1β-methyl-5α,9β,10α-estran-17β-ol-11-one.

3β-methoxy-19-nor - 5α,9β,10α - pregnane-11,20-dione, 5α,9β,10α-estrane-3,11,17-trione and 19-nor-5α,9β,10α-pregnane-3,11,20-trione were treated by the same procedure, thus affording respectively: 3β-methoxy-19-nor-5α,9β,10α-pregnan-20β - ol - 11-one, 5α,9β,10α-estrane-3β,17β-diol-11-one and 19 - nor - 5α,9β,10α-pregnane-3β,20β,diol-11-one.

Example I

A solution of 5 g. of 5α,9β,10α-estrane-3β,17β-diol-11-one in 100 cc. of acetic acid was treated with a few drops of hydrogen bromide in acetic acid and subsequently dropwise and with stirring, with a solution of 1.1 molar equivalents of bromine in 50 cc. of acetic acid. After all the bromine had been consumed, water was added, the formed precipitate filtered, washed with water to neutral and dried under vacuum. Recrystallization from acetone-hexane yielded 12α-bromo-5α,9β,10α-estrane-3β,17β-diol-11-one.

Example II

A solution of 1 g. of the latter steroid in 70 cc. of anhydrous tetrahydrofuran was treated with 1.3 g. of lithium borohydride and the reacting mixture was kept at 10° C. for 5 hours. Water was then added and the whole extracted with methylene chloride. The extract was washed with water, dried and evaporated to dryness. The residue was crystallized from acetone-hexane to give 12α-bromo-5α,9β,10α-estrane-3β,11β,17β-triol.

Example III

A mixture of 5 g. of the latter compound, 25 g. of zinc dust and 400 cc. of glacial acetic acid was refluxed under stirring for 2 hours, at the end of which the mixture was filtered through celite. The filtrate was concentrated to a small volume under reduced pressure, cooled and diluted with ice water to precipitate the crude product. Recrystallization from acetone-hexane furnished $\Delta^{11}$-5α,9β,10α-estrene-3β,17β-diol.

Example IV

A solution of 2.0 g. of the latter compound in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane afforded 5α,9β,10α-estrane-3β,17β-diol.

Example V

A suspension of 0.5 g. of 5% palladium on charcoal catalyst in 50 cc. of methanol was hydrogenated for 30 minutes. A solution of 2 g. of $\Delta^{11}$-5α,9β,10α-estrene-3β,17β-diol in 200 cc. of methanol was added to the catalyst and stirred under a hydrogen atmosphere until the uptake of hydrogen ceased. After removal of the catalyst by filtration the solution was evaporated and the crude residue was purified by crystallization from methylene-chloride-hexane, thus giving 5α,9β,10α-estrane-3β,17β-diol.

Example VI

3β-methoxy - 1β -methyl-5α,9β,10α-estran-17β-ol-11-one was treated, successively, in accordance with Examples I, II, III and IV, thus yielding respectively: 12α-bromo-3β-methoxy - 1β - methyl-5α,9β,10α-estran-17β-ol-11-one, 12α-bromo - 3β - methoxy - 1β - methyl-5α,9β,10α-estrane-11β,17β-diol, 3β-methoxy - 1β - methyl-$\Delta^{11}$,5α,9β,10α-estren-17β-ol, and 3β-methoxy-1β-methyl-5α,9β,10α-estran-17β-ol.

Example VII

3β-methoxy - 19 - nor-5α,9β,10α-pregnan-20β,ol-11-one was treated, consecutively, according to Examples I, II, III and IV, thus giving respectively: 12α-bromo-3β-methoxy - 19 - nor - 5α,9β,10α - pregnan-20β-ol-11-one, 12α-bromo-3β-methoxy - 19 - nor-5α,9β,10α-pregnane-11β,20β-diol, 3β-methoxy - $\Delta^{11}$ - 19-nor-5α,9β,10α-pregnen-20β-ol and 3β-methoxy-19-nor-5α,9β,10α-pregnan-20β-ol.

Example VIII 19-nor-5α,9β,10α-pregnane - 3β,20β - diol - 11 - one was treated, successively, in accordance with Examples I, II, III and IV, thus furnishing respectively: 12α-bromo-19-nor-5α,9β,10α-pregnane-3β,20β-diol-11-one, 12α - bromo-19-nor-5α,9β,10α-pregnane-3β,11β,20β - triol, $\Delta^{11}$-19-nor-5α,9β,10α-pregnene - 3β,20β - diol and 19-nor-5α,9β,10α-pregnane-3β,20β-diol.

Example IX

3β-methoxy-1β-methyl-5α,9β,10α-estrane - 11,17 - dione was treated according to Example I, except that there were added 2.2 molar equivalents of bromine, thus giving 12α,16α-dibromo-3β-methoxy-1β - methyl - 5α9β,10α - estrane-11,17-dione, which, in turn, was treated successively according to Examples II, III and V, thus yielding respectively: 12α,16α-dibromo-3β-methoxy - 1β - methyl - 5α,9β,10α-estrane-11β,17β-diol, 3β-methoxy-1β-methyl-$\Delta^{11,16}$-5α,9β,10α-estradiene and 3β-methoxy-1β-methyl-5α,9β,10α-estrane.

Example X

3β-methoxy-19-nor-5α,9β,10α-pregnane - 11,20 - dione was treated in accordance with IX, thus giving respectively: 12α,17α-dibromo-3β-methoxy-19 - nor - 5α,9β,10α-pregnane-11,20-dione, 12α,17α-dibromo-3β - methoxy-19-nor - 5α,9β,10α - pregnane - 11β,20β - diol, 3β - methoxy-$\Delta^{11,17(20)}$-19-nor-5α,9β,10α-pregnadiene, and 3β-methoxy-19-nor-5α,9β,10α-pregnane.

Example XI

The procedure of Example II was repeated, except that lithium borohydride was substituted by sodium borohydride, tetrahydrofuran was substituted by dioxane and the reaction was carried out at room temperature for 10 hours, thus giving the same final compound.

Example XII

The procedure of Example XI was repeated, except that dioxan was substituted by ethanol, thus affording the same product.

Example XIII

The procedure of Example III was repeated, except that zinc was substituted by chromium, acetic acid and propionic acid and the reaction time was of 10 hours, thus yielding the same product.

We claim:
1. A process for the production of 19-nor-5α,9β,10α-steroids selected from the group consisting of the estrane and 19-nor-pregnane series, which comprises treating the corresponding 11-keto-19-nor-5α,9β,10α-steroid with approximately 1 molar equivalent of bromine for each keto group present in the molecule, in the presence of hydrogen bromide, reducing the obtained 12α-bromo-11-keto-19-nor-5α,9β,10α-steroid with an alkali metal borohydride, treating the formed 12α-bromo-11β-hydroxy-19-nor-5α,9β,10α-steroid with a metal having an oxidation potential of about +0.75 v. in a liquid lower hydrocarbon carboxylic acid, and hydrogenating the produced $\Delta^{11}$-dehydro-19-nor-5α,9β,10α-steroid in the presence of a conventional catalyst.

2. The process of claim 1 wherein the starting steroid has only one keto grouping and the amount of bromine used is approximately 1 molar equivalent.

3. The process of claim 1 wherein the alkali metal borohydride is sodium borohydride.

4. The process of claim 1 wherein the alkali metal borohydride is lithium borohydride.

5. The process of claim 1 wherein the metal is zinc.

6. The process of claim 1 wherein the metal is chromium.

7. The process of claim 1 wherein the catalyst is platinum.

8. The process of claim 1 wherein the catalyst is palladium on charcoal.

9. The process of claim 1 wherein the bromination is carried out in a liquid lower hydrocarbon carboxylic acid.

10. The process of claim 1 wherein the reduction is carried out in a solvent selected from the group consisting of lower alkanols, lower hydrocarbon aliphatic ethers and lower hydrocarbon cyclic ethers.

No references cited.

LEWIS GOTTS, *Primary Examiner.*